United States Patent
Culp

(10) Patent No.: US 7,545,830 B1
(45) Date of Patent: Jun. 9, 2009

(54) DEFRAGMENTED PACKET ANALYSIS FOR DIFFERENTIAL PRIORITY ROUTING

(75) Inventor: Gary Culp, Somerville, AL (US)

(73) Assignee: Adtran, Inc., Huntsville, AL (US)

( * ) Notice: Subject to any disclaimer, the term of this patent is extended or adjusted under 35 U.S.C. 154(b) by 926 days.

(21) Appl. No.: 10/894,115

(22) Filed: Jul. 19, 2004

(51) Int. Cl.
*H04J 3/24* (2006.01)
(52) U.S. Cl. .................... 370/474; 370/470
(58) Field of Classification Search ........... 370/229, 370/347, 412, 466, 372, 328
See application file for complete search history.

(56) References Cited

U.S. PATENT DOCUMENTS

2004/0190548 A1* 9/2004 Harel et al. ............... 370/466
2004/0202191 A1* 10/2004 Vrabel ...................... 370/412
2004/0208120 A1* 10/2004 Shenoi ...................... 370/229

* cited by examiner

*Primary Examiner*—Fan Tsang
*Assistant Examiner*—Simon King
(74) *Attorney, Agent, or Firm*—Allen, Dyer, Doppelt, Milbrath & Gilchrist, P.A.

(57) ABSTRACT

A packet analysis-based mechanism ensures the transmission of critical (voice) frames distributed among a sequence of fragmented frames of data signals. Received fragmented frames are analyzed to derive fragmented frame size information representative of the fragmented frame size. The fragmented frames are then defragmented, to form non-fragmented packets, which are then processed to extract user requested information. The non-fragmented packets are then refragmented in accordance with fragmented frame size information, to derive refragmented frames of information signals, which are then retransmitted in an intermingled manner with non-fragmented voice frames.

6 Claims, 1 Drawing Sheet

DEFRAGMENTED PACKET ANALYSIS FOR DIFFERENTIAL PRIORITY ROUTING

FIELD OF THE INVENTION

The present invention relates in general to digital communication systems and subsystems therefor, and is particularly directed to a packet analysis-based mechanism for ensuring the transmission of critical frames that are distributed among a sequence of fragmented frames of information signals.

BACKGROUND OF THE INVENTION

Packetized voice and data digital communication systems, such as, but not limited to, digitized voice over internet protocol (voice over IP), or digitized voice over frame transmission systems, customarily segment what are typically relatively lengthy packets of data signals into reduced length, fragmented packets. Such fragmentation serves to provide for the intermixing of non-fragmented frames of high priority voice-representative signals with the data fragments in a manner that maintains the timely transport and thereby signal quality of the higher priority digitized voice.

Although packet fragmentation is a successful mechanism for transporting both voice and data over the same communication medium, it creates a problem for the system user, in that fragmentation does not allow the data frames to be directly processed at a subsystem interface for the purpose of gathering information embedded in the data, such as parametric information associated with the performance of an upstream portion of the link. In order to derive this information, non-fragmented frames must be available, which implies the need for some form of defragmentation of the data packets into a format that can be read and analyzed.

Now even though defragmentation readily facilitates direct packet analysis, it must be followed by refragmentation of the data packet, so as to provide room for the insertion of high priority voice packets among the data fragments being transported over the next downstream portion of the communication link. In order for refragmentation to be successful, it is necessary to know the provisioning parameters of the upstream and downstream portions of the link relative to the interface between them. While provisioning may be carried out manually, it is impractical to do so in a network that may have several tens or more of digital communication interfaces along the link.

SUMMARY OF THE INVENTION

In accordance with the present invention, the need to process information signal packets transported over a digital communication link in a fragmented format, while providing for refragmentation of the data, so as to allow for reinsertion of high priority (e.g., voice) packets, is successfully addressed by a fragmentation parameter analysis mechanism. Pursuant to this mechanism, which is implemented as a series of communication control software modules, as digital information signals containing both fragmented data frames and non-fragmented voice frames are sequentially received at a relay interface from an upstream portion of a digital communication link, the signal stream is defragmented into non-fragmented or whole data packets (e.g., superframes) and non-fragmented voice frames. In the course of this defragmentation process, the non-fragmented data packets are analyzed to extract fragment size information to be used during refragmentation of the data packets. The defragmented data packets are then coupled to a packet processor, which processes reconstructed packets as produced by the defragmenter by collecting user requested statistics on the received packets, including, but not limited to, looking to see what type of packet is being transported over the link, performing a priority check, etc.

If the packet being processed by the packet processor is a high priority packet, such as a voice or video packet, it is coupled directly to a high priority queue of an output transmitter for immediate transmission out over a downstream link. As long as there is a high priority (e.g., voice) packet awaiting transmission at high priority queue input, the output transmitter will continue to service the high priority queue. If the packet being processed is other than a high priority packet, however, the packet is coupled to a packet refragmenter, which refragments the defragmented packet back into a series of data frames or fragments that are to be interleaved with high priority voice packets as they are transmitted over the downstream communication link. The output of the refragmenter is coupled to the low priority input of the transmitter.

The size of a respective refragmented frame of data is based upon the frame 'signature' of the original fragmented data as defragmented by the defragmenter, wherein the size of a packet to be processed has been detected. A frame signature includes a header containing a fragment (F) bit, which is set true only if the frame is a fragmented frame, a beginning bit B, which is set true for only the first fragmented frame, and an end bit E, which is set true only for the last fragmented frame in the packet (or superframe).

As frames are received by the HDLC receiver, the defragmented packet's signature is analyzed by the size analyzer. If the packet/frame is not fragmented, it is simply transmitted 'as is'. If it is fragmented, the size analyzer determines whether the detected size is greater than a prescribed threshold. If it is, the threshold value is changed to the size of the packet. This operation serves to find the maximum size of a packet fragment. If analysis of F, B and E bits of the packet reveals that the F bit is true and the B and E bits are false, then it is inferred that the frame is a 'middle' frame. A middle frame is a good candidate to determine fragmented frame size. As a result, the threshold size is set to be equal to the size of the 'middle' frame. This operation is performed whenever the E bit is false and may also include the beginning frame, namely 'not the last frame', which may have a shorter length than a nominal frame L. If the E bit is true (the last frame has been reached), and no action is taken. The packet processor makes sure that critical packets (e.g., real time audio and video) are coupled to the high priority input of the transmitter, while the fragmented frame analysis carried out by the size analyzer ensures that the fragmented packets will be transmitted over the lower priority path in their proper order (as received).

DETAILED DESCRIPTION

Figure 1:
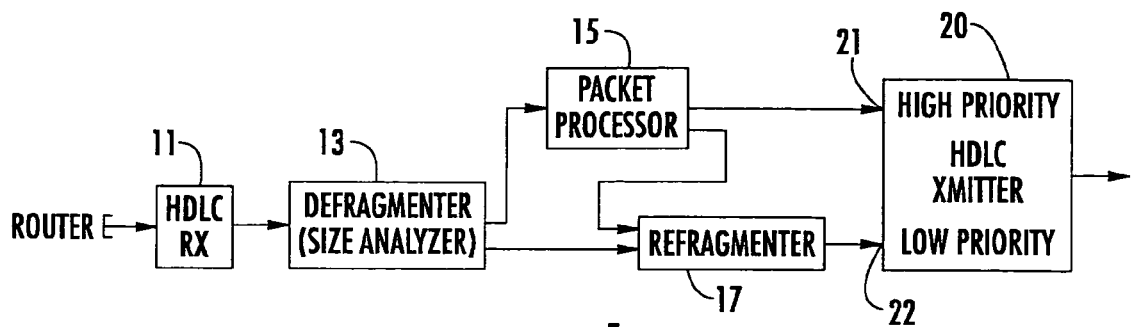
FIG. 1 is a functional block diagram of a defragmented packet analysis mechanism employed for differential priority routing in accordance with the present invention.

Before detailing the defragmented packet analysis mechanism employed for differential priority routing in accordance with the present invention, it should be observed that the invention resides primarily in a set of communication control software modules, which are employed by supervisory digital control and signal processing circuitry, that controls the operation of a prescribed arrangement of conventional communication circuits and components. As a consequence, in the drawings, the configuration of such circuits and components, and the manner in which they are interfaced with various communication circuits have, for the most part, been illustrated by readily understandable block diagrams, which show only those specific details that are pertinent to the present invention, so as not to obscure the disclosure with details which will be readily apparent to those skilled in the art having the benefit of the description herein. Thus, the block diagrams of the Figures are primarily intended to show the various components of the invention in convenient functional groupings, so that the present invention may be more readily understood.

Figure 2:
FIG. 2 shows the composition of digital information signals as relatively high priority and non-fragmented, voice frames intermixed with lower priority, fragmented data frames.

Attention is initially directed to FIG. 1, which is a functional block diagram of the communication control architecture of a defragmented packet analysis mechanism employed for differential priority routing in accordance with the present invention. As shown therein, successive frames of information signals to be defragmented and processed are supplied by way of a digital communication input device, such as an HDLC receiver 11, which may be coupled to receive the digital signals from a digital data source, such as a router. As shown in FIG. 2, the information signals themselves are comprised of relatively high priority and non-fragmented, voice frames VF, that are intermixed with lower priority, fragmented data frames DF.

The output of the HDLC receiver 11 is coupled to a defragmenter 13, wherein the size of a packet to be processed is detected, and wherein frames of data, if arriving in a fragmented format, are defragmented as necessary, to realize a whole data packet entity (e.g., data superframe), so that they may be processed by a packet processor 15. The packet processor 15 processes the reconstructed packet produced by the defragmenter 13 by collecting user requested statistics on the received packets, including, but not limited to, looking to see what type of packet is being transported over the link, performing a priority check, etc. The packet processor 15 makes sure that critical packets (e.g., real time audio and video) are coupled to the high priority input 21 of transmitter 20, while the fragmented frame analysis carried out by the size analyzer 13, ensures that the fragmented packets will be transmitted over the lower priority path in their proper order (as received).

If the packet being processed by the packet processor 15 is a high priority packet, such as a voice packet, it is coupled directly to a high priority queue 21 of an output transmitter 20 for immediate transmission out over a downstream link 30. As long as there is a high priority (voice) packet awaiting transmission at high priority queue input 21, the output transmitter 20 will continue to service the high priority queue. If the packet being processed is other than a high priority voice packet, the packet is coupled to a packet refragmenter 17, wherein the defragmented packet is refragmented back into a series of data frames or fragments that are to be interleaved with voice packets as they are transmitted over the downstream communication link. The output of refragmenter 17 is coupled to the low priority input 22 of transmitter 20. The size of a respective refragmented frame of data is based upon the 'signature' of the original fragmented data as defragmented by the defragmenter 13, wherein the size of a packet to be processed has been detected.

Figure 3:
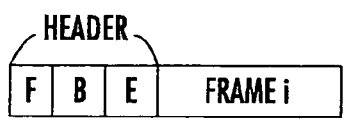
FIG. 3 shows the composition of a defragmented data frame.
Figure 4:
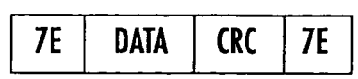
FIG. 4 shows the composition of an HDLC frame.

FIG. 3 shows a frame signature as including a header containing a fragment (F) bit, which is set true only if the frame is a fragmented frame, a beginning bit B, which is set true for only the first fragmented frame, and an end bit E, which is set true only for the last fragmented frame in the packet (or superframe). If the F bit is false, the B and E bits positions are meaningless. It will be recalled that the make-up of an HDLC frame is as shown in FIG. 4, and consists of a 7E (0111 1110) flag header, a DATA field, a DATA field, a CRC field and terminating at another 7E flag. Thus the size of the frame is implicit in HDLC.

As frames are received by the HDLC receiver, the defragmented packet's signature is analyzed by the size analyzer 13. If the packet/frame is not fragmented, it is simply transmitted 'as is'. If it is fragmented, size analyzer 13 determines whether the detected size is greater than a prescribed threshold. If so, the threshold value is changed to the size of the packet. This serves to find the maximum size of a packet fragment. If analysis of F, B and E bits of the packet reveals that the F bit is true and the B and E bits are false, then it is inferred that the frame is a 'middle' frame (i.e., not a beginning frame where the B bit is true, and not an ending frame where the E bit is true) A middle frame is a good candidate to determine fragmented frame size. As a result, the threshold size is set to be equal to the size of the 'middle' frame. This operation is performed whenever the E bit is false and may also include the beginning frame, namely 'not the last frame', which may have a shorter length than a nominal frame L. If the E bit is true (the last frame has been reached), nothing is done.

While I have shown and described an embodiment in accordance with the present invention, it is to be understood that the same is not limited thereto but is susceptible to numerous changes and modifications as known to a person skilled in the art, and I therefore do not wish to be limited to the details shown and described herein, but intend to cover all such changes and modifications as are obvious to one of ordinary skill in the art.

What is claimed:

1. A method of interfacing frames of information signals received from a router as an upstream portion of a communication link with a downstream portion of said communication link, said frames containing fragmented frames of first information signals and non-fragmented frames of second information signals, said method comprising the steps of:

(a) receiving said frames of information signals from said router within a high-level data link (HDLC) receiver as a separate device between the router and a downstream portion;

(b) analyzing said frames of information signals received from said router of said communication link in step (a), to derive size information representative of the fragmented frame size of said fragmented frames of first information signals;

(c) defragmenting said fragmented frames of first information signals, to form non-fragmented packets of said first information signals;

(d) processing said non-fragmented packets of first information signals obtained in step (c) to derive information associated with the transport of said frames of information signals from said router;

(e) granting priority of transmission to said second information signals relative to said first information signals;

(f) refragmenting said non-fragmented packets of first information signals processed in step (d), in accordance with said fragmented frame size information derived in step (c), to derive refragmented frames of first information signals; and (g) transmitting said frames of said second information signals and said refragmented frames of first information signals from a HDLC transmitter coupled to the HDLC receiver over said second portion of said communication link.

2. The method according to claim 1, wherein said first information signals comprise data-representative signals, and said second information signals comprise voice-representative information signals.

3. The method according to claim 1, wherein step (g) includes intermingling said frames of said second information signals with said refragmented frames of first information signals in the course of transmission thereof over said second portion of said communication link.

4. A communication system interface which is operative to interface frames of information signals received from a router of a communication link with a second portion of said communication link, said frames containing fragmented frames of first information signals and non-fragmented frames of second information signals, said system comprising:

a high-level data link (HDLC) receiver which is operative to receive said frames of information signals from said first portion of said communication link;

a frame analyzer which is operative to analyze said frames of information signals received from said first portion of said communication link, to derive size information representative of the fragmented frame size of said fragmented frames of first information signals;

a defragmenter which is operative to defragment said fragmented frames of first information signals, to form non-fragmented packets of said first information signals;

a non-fragmented packet processor which is operative to process said non-fragmented packets of first information signals formed by said defragmenter to derive information associated with the transport of said frames of information signals over said first portion of said communication link;

a high-level data link (HDLC) output transmitter, which is coupled to grant priority of transmission to said second information signals relative to said first information signals; and a refragmenter, which is operative to refragment said non-fragmented packets of first information signals coupled to said packet processor, in accordance with said fragmented frame size information, so as to derive refragmented frames of first information signals; and wherein said HDLC output transmitter is operative to receive the frames from the refragmenter and packet processor and transmit said frames of said second information signals and said refragmented frames of first information signals over said second portion of said communication link.

5. The communication interface according to claim 4, wherein said first information signals comprise data-representative signals, and said second information signals comprise voice-representative information signals.

6. The communication interface according to claim 4, wherein said output HDLC output transmitter is operative to intermingle said frames of said second information signals with said refragmented frames of first information signals in the course of transmission thereof over said second portion of said communication link.

* * * * *